United States Patent [19]
Jordan et al.

[11] Patent Number: 5,398,273
[45] Date of Patent: Mar. 14, 1995

[54] X-RAY BASED EXTENSOMETRY DEVICE

[75] Inventors: Eric H. Jordan, Storrs; Howard A. Canistraro, West Hartford; Douglas M. Pease, South Windsor, all of Conn.

[73] Assignee: The University of Connecticut, Storrs, Conn.

[21] Appl. No.: 56,307

[22] Filed: Apr. 30, 1993

[51] Int. Cl.$^6$ .......................................... G01N 23/223
[52] U.S. Cl. .................................... 378/44; 378/81; 378/146; 378/145
[58] Field of Search ................... 378/44, 45, 46, 47, 378/48, 49, 50, 81, 84, 85, 145, 146

[56] References Cited

U.S. PATENT DOCUMENTS 4,577,337  3/1986  Light ........................................ 378/44
5,220,591  6/1993  Ohsugi et al. ........................ 378/44 X

FOREIGN PATENT DOCUMENTS 0057145  4/1984  Japan ...................................... 378/44

OTHER PUBLICATIONS

High Temperature Displacement Measurement Using a Scanning Focussed X-Ray Line Source: Jordan et al *Advances in X-Ray Analysis,* Jun. 1991.
X-Ray Based Displacement Measurement for Hostile Environments: Canistraro et al "NASA Technical Memo 105551" Mar. 1992.
X-Ray Beam Method for Displacement Measurement in Hostile Environments and Strain Measurements Conference: E. H. Jordan et al, Nov. 1989.

*Primary Examiner*—David P. Porta
*Attorney, Agent, or Firm*—Fishman, Dionne & Cantor

[57] ABSTRACT

A displacement measuring system includes means for focusing x-rays into a narrow, intense beam which can be used to excite targets that fluoresce secondary x-rays. By precisely measuring the focused image position as the focused image is caused to overlap the fluorescing target, relevant changes in target position can be determined. The x-rays are focused using a novel Johansson ground and bent crystal which, along with the x-ray tube, is mounted on a common base for lineal scanning. This common base preferably comprises a linear translation table. By scanning the beam onto fluorescing targets, edge detection can be accomplished by monitoring subsequent x-ray fluorescing using an appropriate detector whose output is measured and recorded. In a preferred embodiment, the detector is formed integral with an enclosure for enclosing the x-ray tube and bent crystal on the linear translation table. By comparing beam position with detector output, an exact measurement of target edge position with respect to that of the crystal can be achieved. If the target is then translated and the scan repeated, a precise measurement of its displacement can be made. If two targets are used with one or more beams, strain measurement between the targets can be accomplished.

32 Claims, 4 Drawing Sheets

--------- RESOLUTION VS. SCAN PERIOD FOR PRESENT INVENTION
——————— RESOLUTION VS. SCAN PERIOD FOR PRIOR ART

X-RAY BASED EXTENSOMETRY DEVICE

BACKGROUND OF THE INVENTION

This invention relates generally to the field of extensometry or displacement measurement. More particularly, this invention relates to a new and improved x-ray based displacement measurement method and apparatus particularly well suited for hostile and/or high temperature environments.

Improved ability to produce engineering components for hostile environment use is very important for continued increases in efficiency of fuel burning engines, and is a prerequisite for successful development of the more ambitious hypersonic flight vehicles such as the National Aero Space Plane (NASP). A fundamental requirement of these and other advanced programs is the ability to measure the mechanical response of newly available materials under realistic operating conditions. These may include high-temperature - high-velocity gas flows, significant pressure gradients or the presence of flames and smoke. The measurement of strain and displacement under such conditions is very challenging and a limited number of available methods including high-temperature strain gages, ceramic rod extensometers, and laser optical systems can be used under specific environmental conditions. Strain gages seem to be limited to temperatures below 1000° C. and strains of only a few thousand microstrain. Contacting extensometers present access problems in some cases and cannot be used in the presence of high-velocity gas flows. Laser based optical methods appear to be the least restrictive, but hot gases above ambient pressure are a severe problem because of refraction of the source laser beam. In addition, smoke and dust can cause the accuracy of such systems to greatly deteriorate.

A significantly different method and apparatus for extensometry which is particularly well suited for displacement measurement in hostile environments is based on x-rays (as opposed, for example, to prior art laser measurements). Such an x-ray based measurement apparatus has been described by the inventors herein in the following papers:

Jordan E. H.., Pease D. M., Canistraro H. A., *Displacement Measurement Using a Scanning Focussed X-Ray Line Image*, Advances in X-Ray Analysis: Proceedings of the 39th Annual Denver X-Ray Conference, Volume 34, Pergammon Press, New York, June 1991.

Jordan E. H., Pease D. M., Canistraro H. A., *X-Ray Beam Method for Displacement Measurements in Hostile Environments*, Proceedings of the Sixth Annual Hostile Environments and Strain Measurements Conference - Society for Experimental Mechanics, Bethel Conn., November 1989.

The system described in the above papers is based on the ability to focus and scan low energy, hard x-rays such as those emanating from copper or molybdenum sources. The x-rays are focused into a narrow and intense line image which can be scanned onto targets that fluoresce secondary x-ray radiation. This radiation is monitored and target edge position can be determined by measuring the beam pointing angle when the marker begins to fluoresce. This system has the ability to conduct macroscopic strain measurement in hostile environments by utilizing two or more fluorescing targets. An important advantage of this technique lies in the penetrating nature of x-rays which are not affected by the presence of refracting gas layers, smoke, flame or intense thermal radiation, all of which could render conventional extensometry methods inoperative or greatly compromise their performance.

Figure 1:
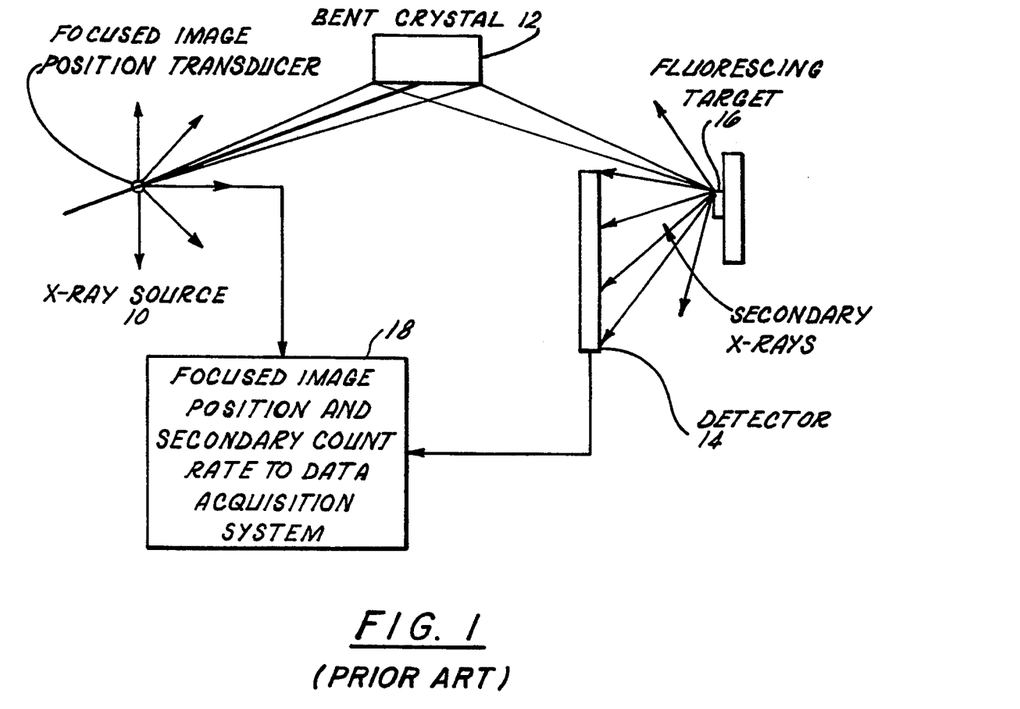
FIG. 1 is a schematic plan view of an x-ray based displacement measuring system in accordance with the prior art.
Figure 2:
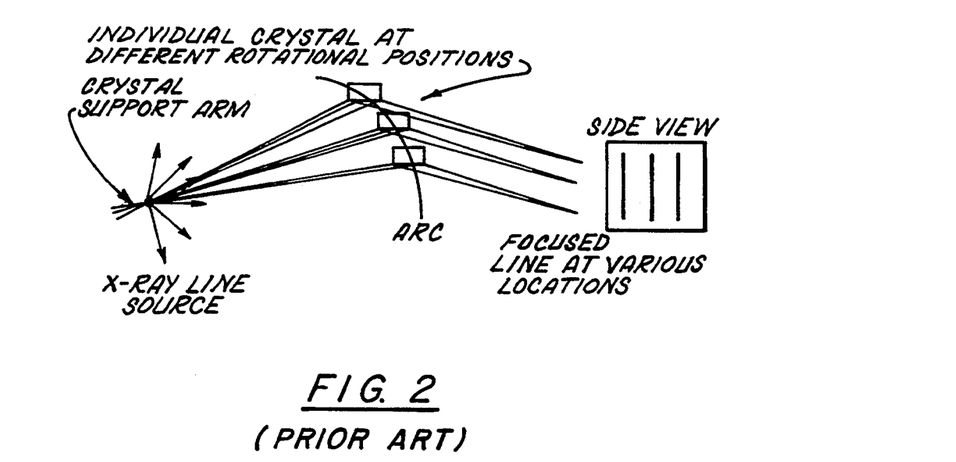
FIG. 2 is a schematic of the prior art displacement measuring system of FIG. 1 depicting use of a rotational arm.

The prior art x-ray based measurement system comprised the components of FIG. 1 including an x-ray source 10 which emits x-rays to a bent crystal 12, a detector 14 for detecting secondary x-rays emitted from a fluorescing target 16 and a controller/processor (e.g., computer) 18 for controlling beam pointing angle and secondary count rate to the data acquisition system. In order to conduct the contemplated types of displacement measurements, beam stability and focus are critical, as any fluctuation in intensity can be misinterpreted as displacement. Because the focusing crystal only reflects for one incident angle, it is necessary to consider how the beam is to be scanned. This task was accomplished in the prior art by rotating the crystal (along an arc) on an arm whose center is located directly below the x-ray line source as shown in prior art FIG. 2. Testing of direct beam count rates revealed stability of better than 1 percent over a 1.25 cm linear range (approximated by an arc).

However, while well suited for its intended purposes, this prior art x-ray based system suffers from several important drawbacks and deficiencies. For example, the prior art method of scanning the x-ray image (along an arc) introduced several problems to the measurement technique. First the rotational arm only permitted a limited image scan range, greatly reducing the measurement gage length that could be examined by the device. Additionally, the rotational arm caused the image to move on the arc of circle, whereas the device is intended for uni-axial measurements, and this angular motion is undesirable. Stability also suffered because of the nature of the way in which the crystal accepts different regions of the source filament during rotation. This effect introduces fluctuations in the focused x-ray image geometry and intensity during the course of a measurement scan, thereby, degrading the resolution of the system.

Another deficiency of the prior art was the x-ray focusing crystal. The crystal was not in any way tailored to the present application. Therefore, the crystal was not designed to provide the most narrow and intense x-ray image as possible which is required to optimize resolution and scan frequency.

SUMMARY OF THE INVENTION

The above-discussed and other problems and deficiencies of the prior art are overcome or alleviated by the novel method and apparatus for extensometry of the present invention. In accordance with the present invention, a displacement measuring system includes means for focusing x-rays into a narrow, intense beam which can be used to excite targets that fluoresce secondary x-rays. By precisely measuring the focused image position as the focused image is caused to overlap the fluorescing target, relevant changes in target position can be determined. The x-rays are focused using a novel Johansson ground and bent crystal which, along with the x-ray tube, is mounted on a common base for lineal scanning. This common base preferably comprises a linear translation table. By scanning the beam onto fluorescing targets, edge detection can be accomplished by monitoring subsequent x-ray fluorescing using an appropriate detector whose output is measured and recorded. In a preferred embodiment, the detector is formed integral with an enclosure for enclosing the x-ray tube and bent crystal on the linear translation table. By comparing beam position with detector output, an exact measurement of target edge position with respect to that of the crystal can be achieved. If the target is then translated and the scan repeated, a precise measurement of its displacement can be made. If two targets are used with one or more beams, strain measurement between the targets can be accomplished.

The primary advantage of the measurement system of this invention lies in the penetrating, non-refracting nature of x-rays which allow for measurements to be conducted under adverse environmental conditions such as flame, smoke or flowing gases under pressure. In other words, because the measurement system of this invention is based upon x-rays, non-contacting strain measurements can be made in high temperature environments and will not require a vacuum to function properly as is the case for laser based temperatures in excess of 3500 degrees F. In this situation, air density variations in the surrounding environment would render most optical based (e.g., laser) systems ineffective. Measurements in smokey or airborne particulate ridden environments can also be made due to the penetrating characteristic of x-rays.

An important feature of this invention is the ability to scan the focused x-ray beam emanating from the bent crystal by mounting both the tube and focusing crystal on a linear translation stage. This allows for significant translation of the focused beam with little loss of intensity or focus. Preferably, the linear translation table has a resolution of 0.05 microns and displacement measurements of this resolution should be achievable with the present invention. As mentioned above, a serious problem encountered with the prior art x-ray system was the image scanning technique. However, in accordance with the present invention, this problem is overcome by mounting the entire tube-bent crystal system on a common base and then translating the entire unit to accomplish scanning. This technique allows for extremely stable image scanning; since the geometric relation between tube and crystal does not change, permits linear scanning of the image; as opposed to moving it on an arc of a circle, allows for computer control of motion, and yields highly accurate measurement of focused image position. Also enhanced by this technique is the portability of the system and the ability to scan the image at various angles by turning the entire system on its side.

In accordance with another important feature of this invention, the focusing crystal material and geometry has been optimized in order to meet the demands of the present invention. A silicon single crystal oriented to reflect on the (111) plane has been bent and ground to meet the Johansson geometric requirements, with a primary radius of curvature preferably of 1 meter. This preferred embodiment maximizes intensity while providing for the narrowest focused image possible. This novel focusing crystal will permit the present invention to operate at reasonable speeds (i.e., time to conduct a single measurement), and yield the required resolution for conducting meaningful strain and displacement measurements. This crystal configuration will yield countrates and focused intensities at least two orders of magnitude greater than the prior art. Due to the limits of resolution placed on the system by Poisson Fluctuation, the more intense image provided by this invention will yield much greater resolution and shorter scan times.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 3:
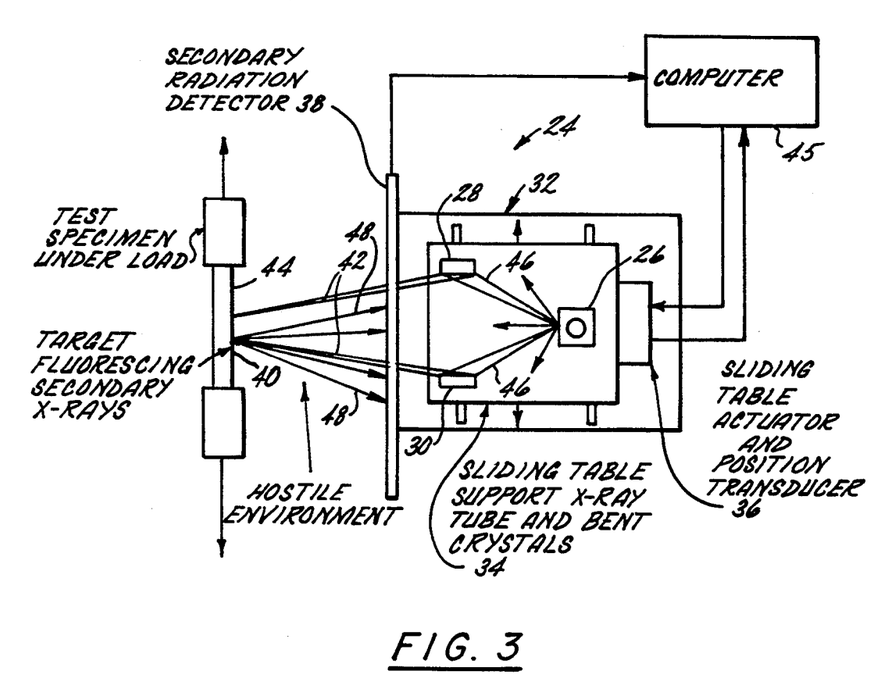
FIG. 3 is a schematic plan view of an x-ray based displacement measuring system in accordance with the present invention.

Referring first to FIG. 3, a schematic view of an x-ray extensometer or displacement measuring apparatus is shown generally at 24. Extensometer 24 includes x-ray scanning means comprised of an x-ray source means 26 in communication with x-ray focusing means 28, 30 for focusing x-rays from the x-ray source means into a narrow intense beam. The x-ray source means 26 comprises an x-ray tube such as a 1.5 Kwatt x-ray tube and the x-ray focusing means comprises at least one bent crystal. In the preferred embodiment shown in FIG. 3, the x-ray focusing means comprises two crystals which are used to simultaneously focus the source into two line images, allowing for decreased "dead time" during the course of a focused image scan. Both the x-ray source and x-ray focusing means are mounted on a common base for scanning. Preferably, this common base comprises a linear translation table 32. Linear translation table 32 includes a sliding table support 34 for supporting the x-ray tube and bent crystals 28, 30, as well as a sliding table acuator and position transducer 36. Linear translation table 32 is commercially available and may comprise, for example, a computer controlled translation stage manufactured by New England Affiliated Technologies of Lawrence, Mass. having a scan range of 2 inches, vertical support capacity of 40 lbs., backlash of less than 0.1 micron and a feedback position transducer with resolution of 0.1 micron. Important advantages of the lineal scanning feature of this invention relative to prior art x-ray band measurement devices are set forth in Table 1.

The x-ray extensometer of the present invention also includes a secondary x-ray detector 38 which unlike the prior art shown in FIG. 1, is preferably a part of an enclosure surrounding the x-ray tube 26 and bent crystals 28, 30. Preferably, detector 38 comprises a Bicron plastic scintillation detector available from Bicron, Inc. of Newburg, Ohio.

Displaced from extensometer 10 is a fluorescing target means 40 for receiving the focused line image 42 from the bent crystals and emitting secondary x-rays in response thereto. The fluorescing target means 40 is adapted for mounting on a target such as shown at 44. It will be appreciated that the test specimen and fluorescing target are displaced from extensometer 24 by a space which may consist of a hostile environment, vacuum or the like.

A computer 45 controls all system components and allows for automated displacement and strain measurements.

During use, x-rays 46 emitted from x-ray source 26 are received by bent crystals 28, 30 and focused into a narrow, intense beam 42 which can be used to excite targets that fluoresce secondary x-rays as shown at 48. By precisely measuring the focused image position as the focus image is caused to overlap the fluorescing target, relative changes in target position can be determined. By scanning the beam onto fluorescing targets, edge detection can be accomplished by monitoring subsequent x-ray fluorescence using detector 38 whose output is measured and recorded. By comparing beam position with detector output, the exact measurement of target edge position with respect to that of the crystal can be achieved. The target is then linearly translated and the scan repeated, so that a precise measurement of its displacement can be made. The resultant data is received by computer 45 where curve fitting of overlap plots are used to provide the displacement measurement. Such curve fitting uses conventional linear regression analysis to establish a first order polynominal equation representing the overlap for the given target position. The individual target position is then cleared to be a secondary count rate. The corresponding target position is the beam position at the chosen secondary count rate value. As will be discussed hereinafter, if two targets are used with one or more beams, strain measurement between the targets can be accomplished.

In addition to the important common scanning base (which preferably comprises the precision linear translation table described above), another important feature of the present invention is the novel Johansson ground and bent crystal. Preferably, the focusing crystal comprises a silicone wafer, oriented to (111) plane. This silicone wafer preferably has dimensions of 4 cm×12 cm and comprises a Johansson ground and bent geometry. In addition, the crystal has a primary radius (grind radius) of 1 meter and secondary radius of 2 meters. Also preferably, uniformity of reflectivity of the crystals is +/−2% along the crystal length.

Figure 4:
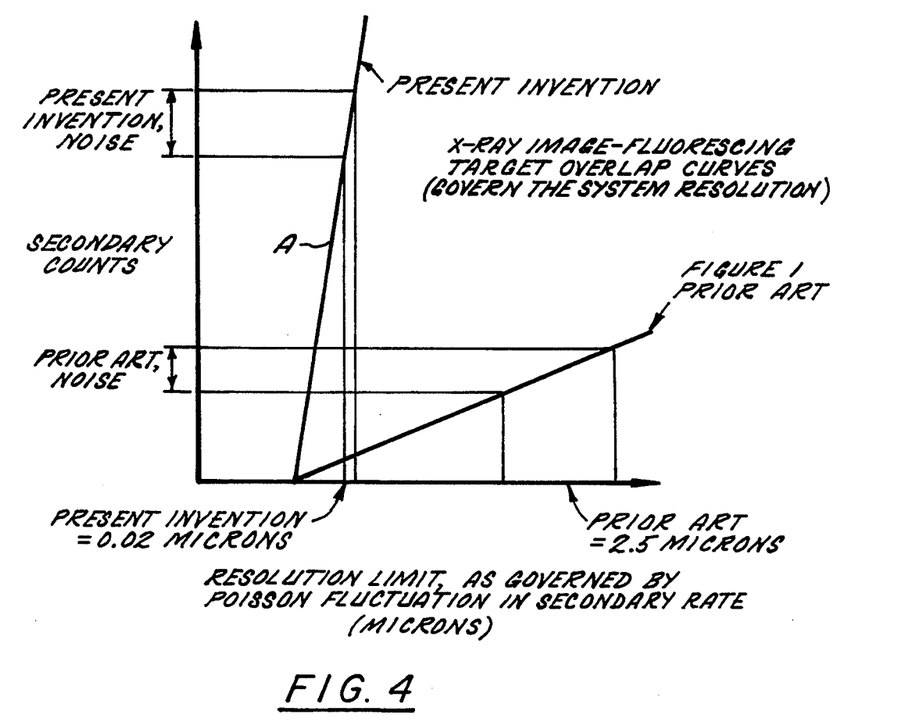
FIG. 4 is a graph depicting the Poisson governed limit for the novel crystal x-ray source of this invention and the prior art x-ray source.

Turning now to FIG. 4, the Poisson governed limit for both the novel bent crystal of the present invention (identified at "A") and the bent crystal used in the prior art of FIG. 1 is depicted for identical scan (approximately 1 second dwell for three secondary count rate measurement points). The present invention provides a resolution limit of 0.02 microns as opposed to the prior art resolution limit of 2.5 microns which is an improvement of several orders of magnitude.

Figure 5:
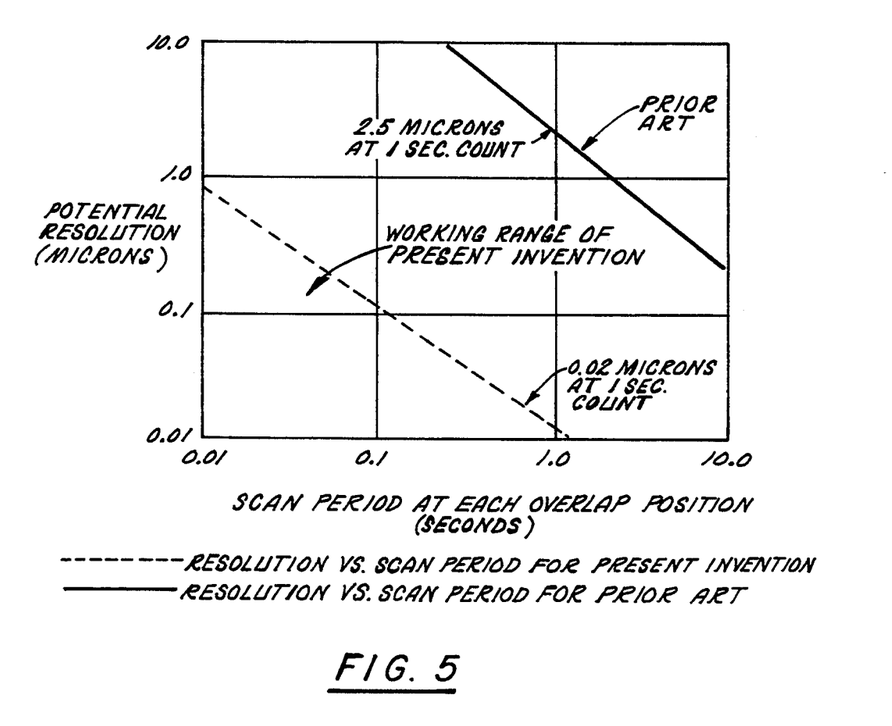
FIG. 5 is a graph depicting the resolution versus scan period for both the present invention and the prior art.

FIG. 5 depicts the resolution versus scan period for both the present invention (identified at "A") and the prior art of FIG. 1. In addition, the useful range for strain measurements using the present invention is also shown. Other important differences between the focusing crystal of the present invention and the focusing crystal of FIG. 1 prior art is noted in Table 1 including important differences in intensity, material, plane of reflection and dimension.

Figure 6:
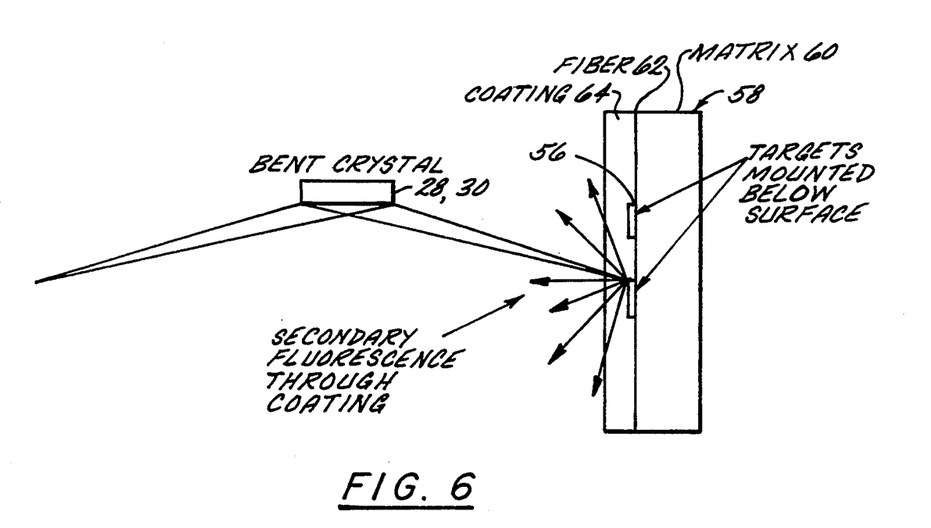
FIG. 6 is a schematic depicting the measuring system of the present invention utilized for subsurface strain measurement.

Besides measuring relative displacements, the present invention may be used in a variety of other measurement applications. For example, the present invention can measure relative displacement changes between two targets and thereby achieve strain measurement. Thus, for example, by placing targets beneath the surface of composites that are transparent to x-rays, displacement measurement of these targets can be made. This will allow for strains near features such as reinforcing fibers or particles to be measured. Such a strain measurement system is shown in FIG. 6 where bent crystal 28 or 30 focuses x-rays to targets 56 mounted below the surface of a composite 58. Composite 58 includes a matrix 60, a fiber 62 and a coating 64. Secondary fluorescence is emitted through coating 64 for strain measurement.

Figure 7:
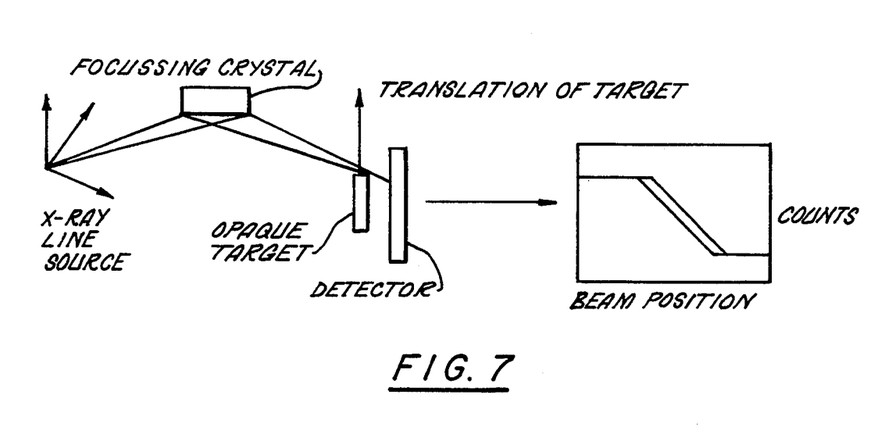
FIG. 7 is a schematic depicting an alternative embodiment of this invention using an opaque target.

In another application for the extensometer of the present invention shown in FIG. 7, the beam is blocked by an opaque target and the detector is placed behind it. The beam is then scanned off the target edge and allowed to pass directly into the detector. This alternative embodiment allows for much higher return concentrations and therefore better displacement resolution.

TABLE 1

| ADVANTAGES VS. DISADVANTAGES: | | |
|---|---|---|
| ASPECT | PRIOR ART (FIG. 1) | PRESENT INVENTION |
| SCANNING SYSTEM: | Rotational Arm | Linear Translation Stage |
| Stability | 5% due to geometric inconsistencies | 0% |
| Resolution | 0.5 micron | 0.05 micron |
| Image path | Moves on the arc of a circle | Linear motion |
| Orientation | Horizontal only (weight problems) | Can be oriented in any plane with appropriate bracketing |
| Automation | Manual only | Computer controlled positioning |
| Durability | Sensitive to shock, arm vibration, etc. | Insensitive to shock due to common mounting plate |
| Focusing Crystal | LiF (200) | Si (111) |
| Intensity | Low intensity | 100 times more intense |
| Material | Lithium Fluoride -not optimum for high intensity | Silicon -optimal for high intensity |
| Plane of Reflection | (200)-low intensity high resolution | (111)-high intensity low resolution |
| Dimension | 2.5 cm. × 2.5 cm. low solid capture angle of source | 4 cm. × 12 cm. large solid capture angle of x-ray source |

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for measuring relative changes in the position of a target comprising:

x-ray scanning means, said x-ray scanning means comprising x-ray source means in communication with x-ray focusing means for focusing x-rays from said x-ray source means into a narrow line image, said x-ray focusing means and said x-ray source means being mounted on a common base for scanning wherein said common base comprises linear translation table means, said x-ray source means and x-ray focusing means being supported on said linear translation table means;

fluorescing target means for receiving said focused line image and emitting secondary x-rays in response thereto, said fluorescing target means being displaced from said x-ray focusing means and being adapted for mounting on a target;

detector means for detecting said secondary x-rays;

comparator means for comparing the position of said line image with the output from said detector means thereby measuring relative change in the position of the target associated with said fluorescing target means.

2. The apparatus of claim 1 wherein said x-ray source means comprises x-ray tube means and said x-ray focusing means comprises:

bent crystal means in communication with said x-ray tube means.

3. The apparatus of claim 1 wherein:

said scanning comprises linear scanning.

4. The apparatus of claim 1 including:

enclosure means for enclosing said x-ray source means and x-ray focusing means on said linear translation table means.

5. The apparatus of claim 4 wherein:

said detector means forms a part of said enclosure means.

6. The apparatus of claim 2 wherein said bent crystal means comprises:

a plurality of spaced bent crystals.

7. The apparatus of claim 2 wherein said bent crystal means further comprise:

Bragg reflecting bent crystal means.

8. The apparatus of claim 7 wherein said bent crystal means further comprises:

a Johansson ground and bent crystal.

9. The apparatus of claim 8 wherein:

said crystal means comprises silicon.

10. The apparatus of claim 9 wherein:

said crystal has a primary radius of curvature of one meter and a secondary radius of curvature of two meters.

11. The apparatus of claim 8 wherein:

said crystal means has a plane of reflection of (111).

12. The apparatus of claim 8 wherein:

said x-ray focusing means has performance characteristics as defined at A in FIG. 5.

13. The apparatus of claim 1 wherein said fluorescing target means comprises:

at least two spaced fluorescing targets wherein said detector means detects secondary x-rays from said at least two spaced fluorescing targets and said comparator means processes said detected secondary x-rays to measure strains in the location of said at least two spaced fluorescing targets.

14. The apparatus of claim 1 wherein:

said fluorescing target means is opaque.

15. The apparatus of claim 14 wherein:

said opaque fluorescing target means is positioned between said x-ray scanning means and said detector means.

16. The apparatus of claim 15 wherein:

said x-ray scanning means directs said narrow, line image to an edge of said opaque fluorescing target means with said secondary x-rays then passing directly to said detector means.

17. An apparatus for measuring relative changes in the position of a target comprising:

x-ray scanning means, said x-ray scanning means comprising x-ray source means in communication with x-ray focusing means for focusing x-rays from said x-ray source means into a narrow line image, said x-ray focusing means and said x-ray source means being mounted on a common base for scanning;

fluorescing target means for receiving said focused line image and emitting secondary x-rays in response thereto, said fluorescing target means being displaced from said x-ray focusing means and being adapted for mounting on a target;

detector means for detecting said secondary x-rays;

comparator means for comparing the position of said line image with the output from said detector means thereby measuring relative change in the position of the target associated with said fluorescing target means;

wherein said x-ray source means comprises x-ray tube means and said x-ray focusing means comprises a Johanssen ground and bent crystal in communication with said x-ray tube means, said crystal being composed of silicon.

18. An apparatus for measuring relative changes in the position of a target comprising:

x-ray scanning means for linear scanning, said x-ray scanning means comprising x-ray source means in communication with x-ray focusing means for focusing x-rays from said x-ray source means into a narrow, line image;

fluorescing target means for receiving said focused line image and emitting secondary x-rays in response thereto, said fluorescing target means being displaced from said x-ray focusing means and being adapted for mounting on a target;

detector means for detecting said secondary x-rays;

comparator means for comparing the position of said line image with the output from said detector means thereby measuring relative change in the position of the target associated with said fluorescing target means.

19. The apparatus of claim 18 wherein said fluorescing target means comprises:

at least two spaced fluorescing targets wherein said detector means detects secondary x-rays from said at least two spaced fluorescing targets and said comparator means processes said detected secondary x-rays to measure strains in the location of said at least two spaced fluorescing means.

20. The apparatus of claim 18 wherein:

said fluorescing target means is opaque.

21. The apparatus of claim 20 wherein:

said opaque fluorescing target means is positioned between said x-ray scanning means and said detector means.

22. The apparatus of claim 21 wherein:

said x-ray scanning means directs said narrow, line image to an edge of said opaque fluorescing target means with said secondary x-rays then passing directly to said detector means.

23. An apparatus for measuring relative changes in the position of a target comprising:

x-ray focusing means for focusing x-rays from x-ray source means into a narrow, line image, said x-ray focusing means having performance characteristics as defined at A in FIG. 5;

fluorescing target means for receiving said focused line image and emitting secondary x-rays in response thereto, said fluorescing target means being displaced from said x-ray focusing means being adapted for mounting on a target;

detector means for detecting said secondary x-rays;

comparator means for comparing the position of said line image with the output from said detector means thereby measuring relative change in the position of the target associated with said fluorescing target means.

24. A method for measuring relative changes in the position of a target including the steps of:

focusing x-rays into a narrow, line image;

lineally scanning said focused x-rays towards a target;

positioning fluorescing target means for receiving said focused line image and emitting secondary x-rays in response thereto, said fluorescing target means being displaced from said x-ray focusing means and being adapted for mounting on a target;

detecting said secondary x-rays; and comparing the position of said line image with the detected secondary x-rays whereby relative change in the position of the target associated with said fluorescing target means is measured.

25. An apparatus for measuring relative changes in the position of a target comprising:

x-ray scanning means, said x-ray scanning means comprising x-ray source means in communication with x-ray focusing means for focusing x-rays from said x-ray source means into a narrow line image, said x-ray focusing means and said x-ray source means being mounted on a common base for scanning;

fluorescing target means for receiving said focused line image and emitting secondary x-rays in response thereto, said fluorescing target means being displaced from said x-ray focusing means and being adapted for mounting on a target;

detector means for detecting said secondary x-rays;

comparator means for comparing the position of said line image with the output from said detector means thereby measuring relative change in the position of the target associated with said fluorescing target means;

wherein said x-ray source means comprises x-ray tube means and said x-ray focusing means comprises a Johanssen ground and bent crystal in communication with said x-ray tube means, said crystal having a plane of reflection of (111).

26. An apparatus for measuring relative changes in the position of a target comprising:

x-ray scanning means, said x-ray scanning means comprising x-ray source means in communication with x-ray focusing means for focusing x-rays from said x-ray source means into a narrow, line image;

opaque fluorescing target means for receiving said focused line image and emitting secondary x-rays in response thereto, said fluorescing target means being displaced from said x-ray focusing means and being adapted for mounting on a target;

detector means for detecting said secondary x-rays;

comparator means for comparing the position of said line image with the output from said detector means thereby measuring relative change in the position of the target associated with said fluorescing target means.

27. The apparatus of claim 26 wherein:

said opaque fluorescing target means is positioned between said x-ray scanning means and said detector means.

28. The apparatus of claim 27 wherein:

said x-ray scanning means directs said narrow, line image to an edge of said opaque fluorescing target means with said secondary x-rays then passing directly to said detector means.

29. An apparatus for measuring relative changes in the position of a target comprising:

x-ray scanning means, said x-ray scanning means comprising x-ray source means in communication with x-ray focusing means for focusing x-rays from said x-ray source means into a narrow line image, said x-ray focusing means and said x-ray source means being mounted on a common base for scanning;

fluorescing target means for receiving said focused line image and emitting secondary x-rays in response thereto, said fluorescing target means being displaced from said x-ray focusing means and being adapted for mounting on a target;

detector means for detecting said secondary x-rays;

comparator means for comparing the position of said line image with the output from said detector means thereby measuring relative change in the position of the target associated with said fluorescing target means; and wherein said x-ray source means comprises x-ray tube means and said x-ray focusing means comprises a plurality of spaced bent crystals in communication with said x-ray tube means.

30. An apparatus for measuring relative changes in the position of a target comprising:

x-ray scanning means, said x-ray scanning means comprising x-ray source means in communication with x-ray focusing means for focusing x-rays from said x-ray source means into a narrow line image, said x-ray focusing means and said x-ray source means being mounted on a common base for scanning;

fluorescing target means for receiving said focused line image and emitting secondary x-rays in response thereto, said fluorescing target means being displaced from said x-ray focusing means and being adapted for mounting on a target;

detector means for detecting said secondary x-rays;

comparator means for comparing the position of said line image with the output from said detector means thereby measuring relative change in the position of the target associated with said fluorescing target means;

wherein said x-ray source means comprises x-ray tube means and said x-ray focusing means comprises a Johanssen ground and bent crystal in communication with said x-ray tube means, said x-ray focusing means having performance characteristics as defined at A in FIG. 5.

31. An apparatus for measuring relative changes in the position of a target comprising:

x-ray scanning means, said x-ray scanning means comprising x-ray source means in communication with x-ray focusing means for focusing x-rays from said x-ray source means into a narrow line image, said x-ray focusing means and said x-ray source means being mounted on a common base for linear scanning;

fluorescing target means for receiving said focused line image and emitting secondary x-rays in response thereto, said fluorescing target means being displaced from said x-ray focusing means and being adapted for mounting on a target;

detector means for detecting said secondary x-rays;

comparator means for comparing the position of said line image with the output from said detector means thereby measuring relative change in the position of the target associated with said fluorescing target means.

32. An apparatus for measuring relative changes in the position of a target comprising:

x-ray scanning means, said x-ray scanning means comprising x-ray source means in communication with x-ray focusing means for focusing x-rays from said x-ray source means into a narrow line image, said x-ray focusing means and said x-ray source means being mounted on a common base for scanning;

fluorescing target means for receiving said focused line image and emitting secondary x-rays in response thereto, said fluorescing target means being displaced from said x-ray focusing means and being adapted for mounting on a target;

detector means for detecting said secondary x-rays;

comparator means for comparing the position of said line image with the output from said detector means thereby measuring relative change in the position of the target associated with said fluorescing target means;

wherein said fluorescing target means comprises at least two spaced fluorescing targets and wherein said detector means detects secondary x-rays from said at least two spaced fluorescing targets and said comparator means processes said detected secondary x-rays to measure strains in the location of said at least two spaced fluorescing targets.

* * * * *